(Model.)
O. TOWER.
THILL COUPLING.
No. 245,265. Patented Aug. 2, 1881.
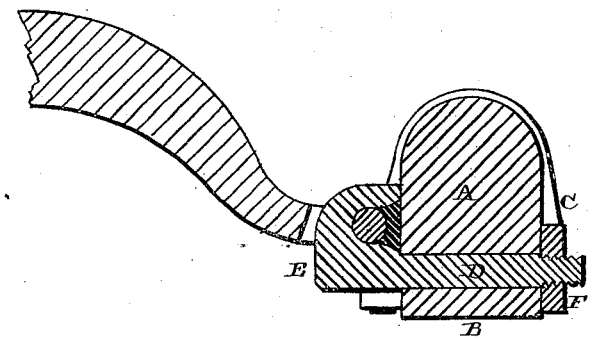
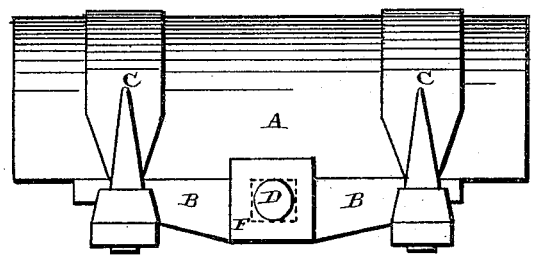
Witnesses.
W. W. Mortimer
A. C. Kiskadden
Inventor.
Oscar Tower,
per
F. A. Lehmann,
Atty.

UNITED STATES PATENT OFFICE.

OSCAR TOWER, OF WILSON, NEW YORK.

THILL-COUPLING.

SPECIFICATION forming part of Letters Patent No. 245,265, dated August 2, 1881.

Application filed May 23, 1881. (Model.)

*To all whom it may concern:*

Be it known that I, OSCAR TOWER, of Wilson, in the county of Niagara and State of New York, have invented certain new and useful Improvements in Thill-Couplings; and I do hereby declare the following to be a full, clear, and exact description of the invention, such as will enable others skilled in the art to which it pertains to make and use it, reference being had to the accompanying drawings, which form part of this specification.

My invention relates to an improvement in thill-couplings; and it consists in securing to the under side of the axle, by means of suitable clips, a bearing block or support through which the rear screw-threaded end of the coupling-iron passes, as will be more fully described hereinafter.

The object of my invention is to attach a coupling to the axle in such a manner that it can be readily adjusted by simply turning a nut whenever the parts become loose, and which can be easily removed and replaced at any time.

Figure 1 is a vertical section of my invention. Fig. 2 is a rear view of the same.

A represents the axle, and B the block or bearing, which is secured to the under side of the axle by means of the two clips C. Passing backward through this bearing-block is the screw-threaded prong D of the coupling E. Passed over the rear end of this prong is a nut, F, by means of which the coupling-iron can be drawn rigidly against the front of the axle so as to tighten it upon the thill-iron, or the nut can be taken off and the coupling at once removed.

Placed between the front of the axle and the rear side of the thill-iron is a suitable block of rubber or other suitable elastic substance, which prevents the thill-iron from coming in contact with the axle and prevents all rattling of the parts.

By means of the bearing-block, which is secured in place at any desired point upon the axle, this coupling can be attached to any vehicle now in use, and can be adjusted back and forth to suit thills of any width.

Another great advantage consists in the ease with which the coupling can be tightened whenever the parts wear loose, for it is only necessary to give the nut one or more turns, when the parts will be drawn easily together. Still another advantage in thus using a block which is fastened to the under side of the axle consists in not weakening the axle, as is necessarily the case where the prong of the coupling-iron is passed through the axle, as has heretofore been done.

I am well aware that the thill-iron has been passed back under the axle and secured in place in the clips, and this I disclaim. My invention differs from this in securing a block to the under side of the axle by means of two clips and then forming the bearing for the thill-iron in this block alone.

Having thus described my invention, I claim—

The combination of the axle A, bearing-block B, that is secured to its under side by means of suitable clips, the coupling-iron having a screw-threaded prong which passes through this block and receives a nut upon its rear end, and a thill-iron, the parts being constructed and arranged to operate substantially as described.

In testimony whereof I affix my signature in presence of two witnesses.

OSCAR TOWER.

Witnesses:
JOHN H. MOORE,
NEWELL C. ARNOLD.